May 11, 1943. W. L. ROY Re. 22,311

LOUVER BLIND

Original Filed Sept. 30, 1942 3 Sheets-Sheet 1

Inventor:
Walter L. Roy,
by Kenway & Wetter
Attorneys

May 11, 1943. W. L. ROY Re. 22,311

LOUVER BLIND

Original Filed Sept. 30, 1942 3 Sheets-Sheet 2

Inventor:
Walter L. Roy,
by Kenway & Witter
Attorneys

May 11, 1943. W. L. ROY Re. 22,311
LOUVER BLIND
Original Filed Sept. 30, 1942 3 Sheets-Sheet 3
Fig. 7.
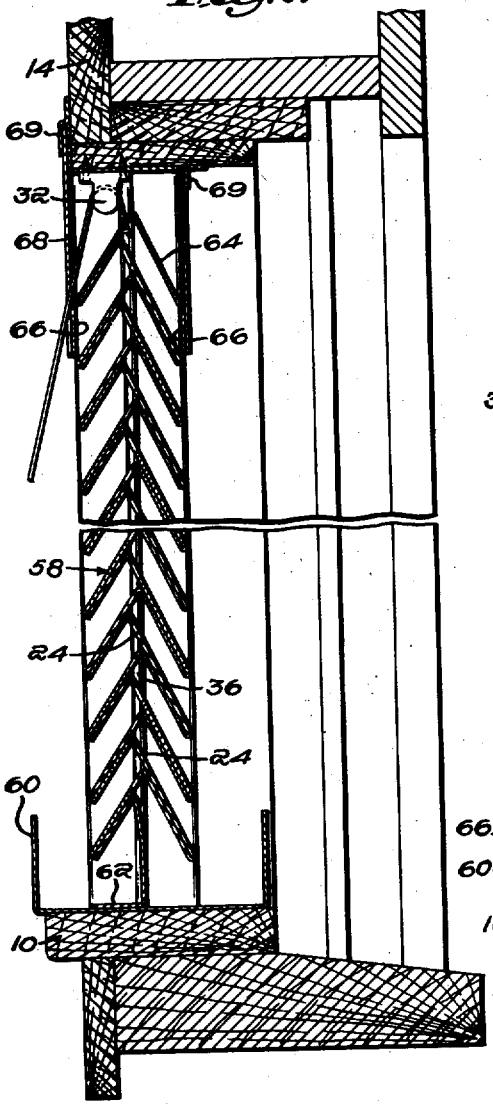
Fig. 8.
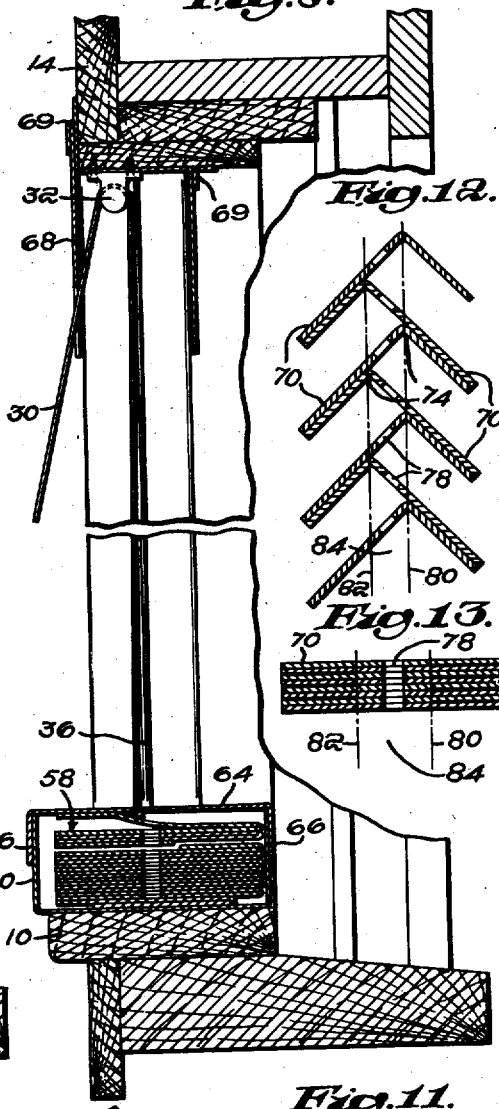
Fig. 12.
Fig. 13.
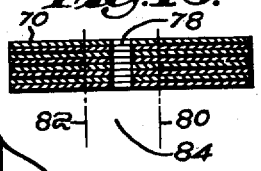
Fig. 9.
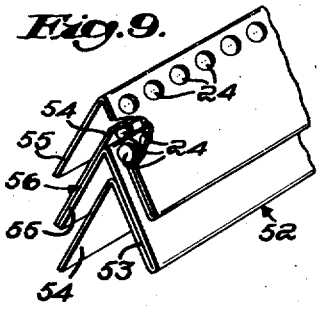
Fig. 10
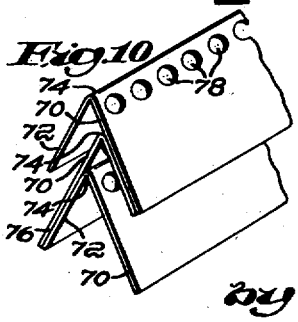
Fig. 11.
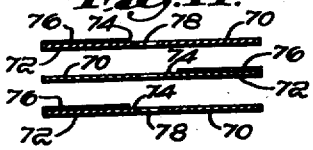
Inventor:
Walter L. Roy
by Kenway & Witter
Attorneys Reissued May 11, 1943

Re. 22,311

UNITED STATES PATENT OFFICE 22,311

LOUVER BLIND

Walter L. Roy, Saugus, Mass., assignor to Litecontrol Corporation, Boston, Mass., a corporation of Massachusetts Original No. 2,305,559, dated December 15, 1942, Serial No. 460,190, September 30, 1942. Application for reissue February 20, 1943, Serial No. 476,562

16 Claims. (Cl. 160—34)

This invention relates to Venetian or louver blinds and more particularly to an improved blind of this nature adapted to close a window opening or the like to reduce or shut off the passage of light and sound therethrough, and at the same time permit ample ventilation. While the invention especially concerns blinds for blackout purposes it is not limited thereto since it is frequently desired to diminish light rays and sound waves rather than to eliminate them entirely.

I am aware that it has been heretofore suggested, as in U. S. Patent 2,059,134, to provide inverted V-shaped Venetian blinds in nested relation to trap light rays and at the same time permit ventilation. The primary object of my invention is to produce a novel, relatively simpler and inexpensive blind which will perform the desired functions in greater degree and efficiency.

Preferably my improved blind is constructed of paper or like fabric folded to provide the desired slats or louvers and so formed that the slats can be positioned compactly in flat collapsed relation when not in use and can be drawn out to an extended and nested V-shaped relation when the blind is to be used. The slats are connected directly to each other in a manner permitting free opening and closing thereof, the open relation being effected by extending the blind from its collapsed position by means of cords or the like cooperating with the slats.

In the preferred construction, each slat or louver embodies a strip of suitable material creased longitudinally to form an axis about which the slat can hinge or pivot to inverted V-shaped when extended from collapsed condition. The several slats can be independent strips attached to each other or all the slats can be formed from a single strip folded to produce the several slats integrally connected to each other in a relation permitting full functioning of the blind. In each case intermediate portions of the slats are perforated to permit ventilation while the slats so overlap as to trap light rays and deaden sound waves. It will be apparent that paper and like fabric absorbs sound waves in large degree and the color of the paper can be such as substantially to cut off any passage of light or diffuse the light in the degrees desired. The production of an improved blind of this nature comprises a further object of the invention.

These and other features of the invention will be best understood and appreciated from the following description of preferred embodiments thereof selected for purposes of illustration and shown in the occompanying drawings in which:

Fig. 7 is a view similar to Fig. 2, but showing a modified construction,

Fig. 8 is a view like Fig. 7, but showing the blind in collapsed position,

Fig. 9 is a fragmentary view showing the construction of the blind illustrated in Fig. 7, Fig. 10 illustrates a modified construction, and Fig. 11 is an end view showing the construction illustrated in Fig. 10, Fig. 12 is a fragmentary end view of the blind shown in Fig. 10 in extended position, Fig. 13 is a like view of the blind in collapsed position.

Figure 1:
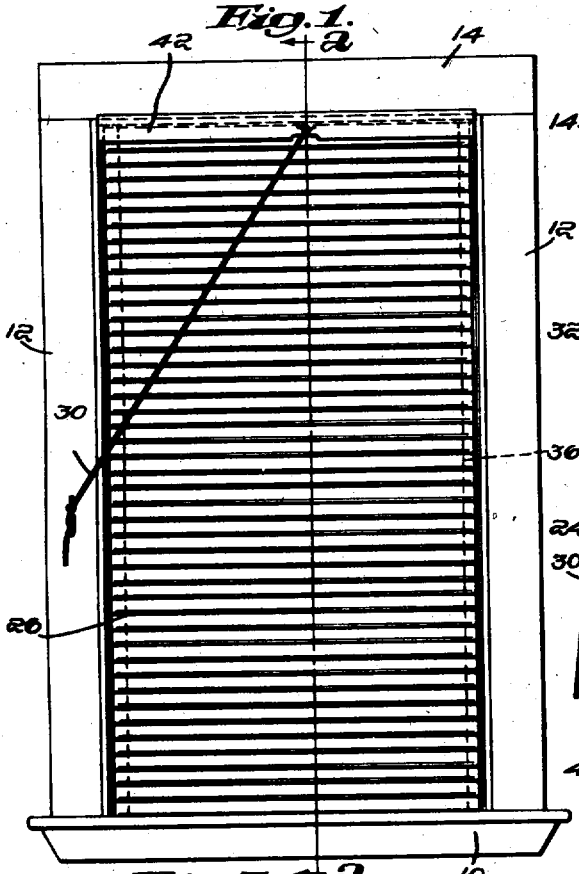
Fig. 1 is a front elevation of a window employing my improved blind.

While in the drawings I have illustrated my novel blind in association with a window it will be understood that its use is not to be construed as thus limited. The window frame illustrated comprises the usual sill 10, frame uprights 12 and top piece 14, and the blind is illustrated as mounted therein.

I shall first refer to Figs. 1–4 and 6 of the drawings wherein the blind is illustrated as formed from a single strip of material 16. This strip 16 can be of any suitable fabric, either paper or treated cloth. I preferably employ paper of a sulphite base or kraft type. The strip is of the width of the proposed blind and is creased transversely on the lines 18 and 19, it being noted that on one side of each crease line is a panel 20 narrower than the panel 22 on the other side. The panels 22 are also perforated at 24 adjacent to the crease lines 19.

Figure 6:
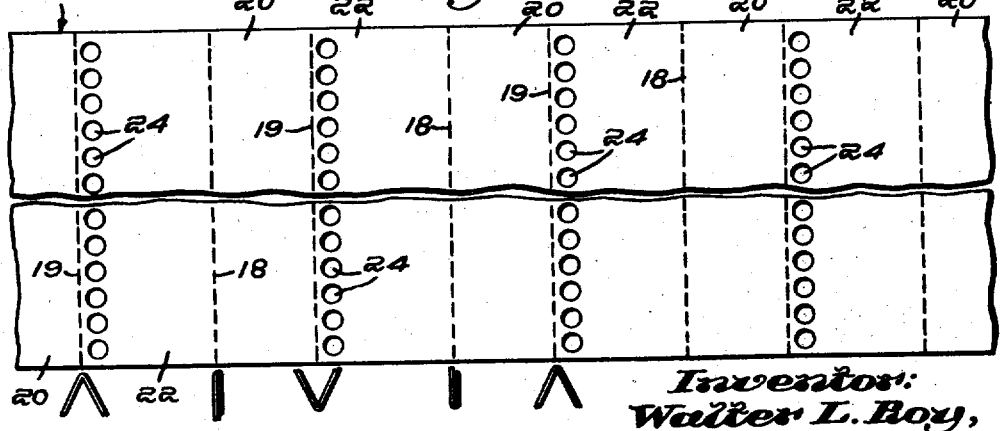
Fig. 6 is a plan view of a strip of material from which the blind is formed.

The blind is formed by folding the strip 16 on the crease lines 18 and 19 in the directions indicated at the bottom of Fig. 6. The first two panels 20 and 22 at the left and at opposite sides of the perforations 24 are folded on the line 19 to the inverted V-shape indicated. The adjacent panels 22 and 20 are folded into face to face contact in the same direction on the line 18. The next adjacent panels 20 and 22 are folded V-shaped on the line 19. The next adjacent panels 22 and 20 are folded into face to face contact as indicated. This sequence of folding is followed throughout the length of the strip and the folds about the lines 18 are brought to and adhesively secured in face to face contact. The resulting product when thus folded is illustrated in Fig. 2.

The blind as thus constructed comprises a plurality of louvers or slats integrally connected together. Each slat comprises two side wall portions 26 hinged together along the crease line 19, one portion being double walled throughout from the axis 19 outwardly and narrower than the other portion which includes the panel portion perforated at 24 and connecting the two adjacent slats. When the blind is mounted in vertical position as illustrated in Figs. 1–4 the slats are adapted to collapse into substantially flat superposed relation with the two walls of each slat in closely adjacent and substantially parallel planes. In fact, the two walls joined at the pivot axis 19 will be in a common horizontal plane, and the two walls respectively and adhesively attached in face to face contact thereto, above and below, will be in parallel planes directly adjacent to said common plane therebetween. While as illustrated in the drawings, the bottom panel of the blind is secured to the window sill 10 as by nails 28, and the blind is adapted to be raised by a cord 30 attached to the top slat and extending over a sheaf 32, it will be understood that the method of collapsing and extending the blind can be varied and modified as may seem most efficient and desirable.

It will be noted (Fig. 2) that the blind comprises two groups of slats with the slats of one group arranged alternately with respect to the slats of the other group, and with the slats of each group arranged in vertical alignment and spaced laterally of the other group which is also in vertical alignment. The pivot axes 19 (apexes 40) of one group are also in a vertical plane spaced laterally of a vertical plane containing the axes 19 of the other group. The ends of the slats are recessed at 34 between said planes and vertically extending elements 36, preferably made of paper and impervious to light and attached to the window frame at 38, extend into the recesses 34. These elements serve both to guide the blind and close the ends against passage of light rays.

Figure 2:
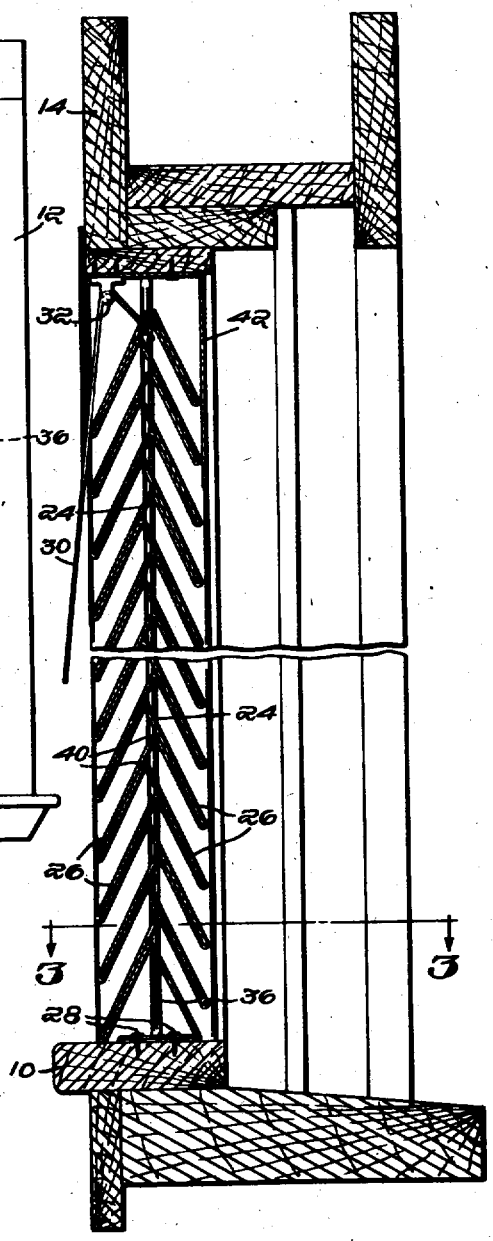
Fig. 2 is a vertical section taken on line 2—2 of Fig. 1.
Figure 3:
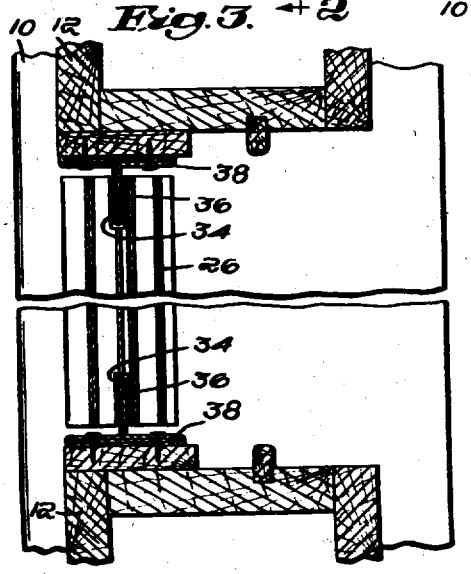
Fig. 3 is a horizontal section taken on line 3—3 of Fig. 2.
Figure 4:
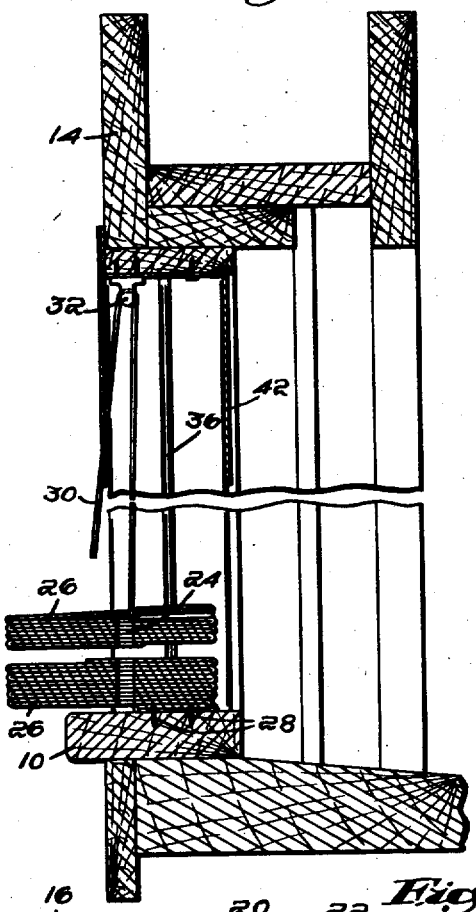
Fig. 4 is similar to Fig. 2, but showing the blind in collapsed position.

The slats stack automatically into flat superposed relation when the blind is collapsed and, when the blind is extended, as by the cord 30 to the position of Fig. 2, the slats pivot about their axes 19 into inverted V shape with the axis apex of each slat located within the re-entrant V recess of the slat thereabove. In such position the passage of light rays is excluded.

By reference to Fig. 2 it will be noted that the outside panel 22 of each side wall extends upwardly beyond the apex 40 thereof and is connected to the next adjacent wall thereabove, these connecting portions of the strip located between the apexes 40 being perforated at 24. The perforations permit ample ventilation through the blind without permitting light rays to pass therethrough. It will be apparent that sound waves are also trapped and substantially deadened by the blind. A housing 42 open at its bottom portion for receiving the blind in the raised position of Fig. 2 is secured to the top end of the frame, the housing serving to cut off any light rays that might project over the top of the blind.

Figure 5:
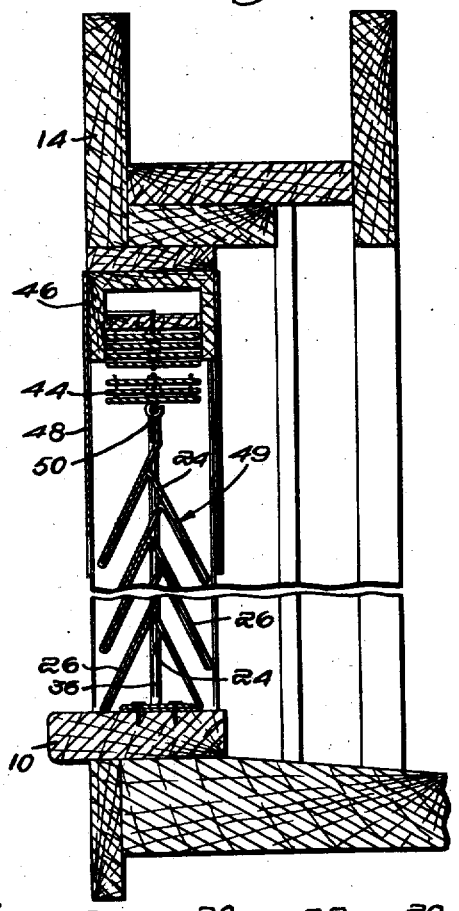
Fig. 5 is a similar view showing a modified form of the invention.

In Fig. 5 I have illustrated use of the blind in connection with an ordinary Venetian blind 44. A housing 46 is provided for receiving the Venetian blind in its raised position and an extension thereof is provided at 48 for receiving the top end of the blackout blind 49. A detachable connection is provided at 50 between the top end of the blind 49 and the bottom end of the Venetian blind. As illustrated, the blind 49 normally rests in collapsed position at the bottom of the window opening, preferably in a box of the nature illustrated in Figs. 7 and 8. When it is desired to use the blackout blind, it is merely attached to the Venetian blind at 50, whereupon raising of the Venetian blind serves to raise the blind 49 to its functioning position.

It is appreciated that my improved blind can be constructed in numerous ways. For example, strips can be folded to form the double V slats 52, two of which are illustrated in Fig. 9. Each of these slats comprises a double wall 53 together with two single side walls 54 and 55. The double wall comprises one panel in adhesive face to face contact with a portion of an adjacent and wider panel. The latter has a perforated portion continuing on and supporting the panel 55. The panels 54 are wider than the panels 55 and are in face to face adhesive contact therewith at 56 as illustrated in Fig. 9. The slats 52 are assembled by stacking them flatly in superposed relation, the top faces of the panels 55 being adhesively coated whereby to connect the slats together. The blind 58, illustrated in Figs. 7 and 8, is constructed in this manner.

I also preferably provide a container 60 supported on the window sill for receiving and housing the blind in the collapsed position illustrated in Fig. 8. The container is secured adhesively to the sill and the bottom end of the blind is secured adhesively to the container at 62. The top slat 64 is also provided with two side wings 66 fitting within the housing 68 when the blind is up (Fig. 7) and serving together with the top slat as a tight cover for the container when the blind is down (Fig. 8). The housing and other parts can be conveniently secured in place by adhesive tape 69. This blind otherwise functions in the same manner as the blind illustrated in Figs. 1–4.

In Figs. 10 and 11 I have illustrated another method of constructing the blind in the form of single V slats. Strips are folded to provide two panels 70 and 72 joined along a creased apex axis 74, the panel 70 being wider and including a portion perforated at 78. The strips are assembled in flat relation as illustrated in Fig. 11. The narrower panels of the strips are coated adhesively at 76 and the panels are then stacked into the alternately and reversely arranged relation illustrated in Fig. 11. The several slats are thereupon secured together at their adhering faces and in a manner producing the blind illustrated in Fig. 10.

The blind has been above described as comprising a plurality of slats each embodying two side walls hingedly connected together. Each of these two side walls is, in fact, a rectangular slat, similar to a Venetian blind slat, and for purposes of description the blind can be considered as comprising a plurality of rectangular and parallel slats arranged in two laterally adjacent and parallel groups with each slat in each group extending partially into the other group between two slats thereof within a predetermined overlapping zone located between the two relatively spaced vertical planes passing through the pivot axes 19. Each slot is attached to the next slat thereabove for hinging movement about an axis in one margin of said zone and has the next lower slat attached thereto for hinging movement about an axis in the other margin of said zone. This relation is more clearly illustrated in Figs. 12 and 13 of the drawings which will now be described.

The blind illustrated in Figs. 12 and 13 is constructed from the form of slats shown in Fig. 10. Each slat thereof comprises a rectangular panel 70 attached to the adjacent slat thereabove for hinging movement about an axis 74 in one margin 80 or 82 of an overlapping zone 84. The slats are arranged in two laterally adjacent groups wherein the slats partially overlap alternately within this zone. Each slat in each group extends partially between two slats of the adjacent group within said zone and is attached for relative hinging movement to said two slats on axes 74 extending respectively along the lines of intersection of the slats as illustrated in Fig. 12. The two hinge axes 74 of each slat are located respectively along opposite margins 80 and 82 of said zone with all the axes at one margin located in lateral alignment and parallel to the aligned axes at the other margin thereof. The arrangement is such that the slats can be collapsed compactly into flat superposed relation with the slats in face to face contact, as illustrated in Fig. 13, or drawn outwardly into the extended relation of Fig. 12 during which the relatively adjacent slats hinge about the axes 74 to V-shape with each hinge apex portion located within the open reentrant V recess of the next adjacent V-shaped slats thereabove.

My improved blind is preferably made of paper or like soft and inexpensive material which can be conveniently produced in desirable color and texture and readily cut and folded to the blind forming shape. Such material furthermore has the quality of absorbing light rays and sound waves. While the blind is especially adapted to serve blackout purposes with great efficiency its use is by no means limited to military periods but is likewise very adaptable to peace times. For blackout purposes the blinds will ordinarily be black or of a dark color, whereas, for some peace time uses its color will vary. For example, the invention can be constructed to serve as a partition or screen, either dark or of a color hue, photographic dark room screens in dark or red hue, and in fact in any location where a screen or draw shade is desirable.

Having thus disclosed my invention, what I claim as new and desire to secure by Letters Patent of the United States is:

1. A blind, comprising a plurality of elongated slats in superposed relation vertically, each slat comprising two side walls hinged together on an axis extending longitudinally of the slats and the slats being adapted to collapse into substantially flat superposed relation with the two walls of each slat in closely adjacent and substantially parallel planes, and means connecting each slat adjacent to and along its said axis to one wall of the slat thereabove along a line parallel with and spaced from its said axis, the slats being adapted each to assume an inverted V-shape with the hinge axis apex of each slat located within the re-entrant V recess of the slat thereabove when the blind is supported by the top slat.

2. The blind defined in claim 1 in which the apex of each slat is connected to one wall of the slat thereabove along a line parallel with and spaced from the apex of the latter.

3. The blind defined in claim 1 in which the slats comprise two groups with the slats of one group arranged alternately with respect to the slats in the other group and with the hinge axes of the two groups respectively located in two relatively spaced vertical planes.

4. The blind defined in claim 1 in which the slats have vertically aligned slots extending thereinto at their ends, and fixed vertically extending element impervious to light extending into the slots at the two ends of the blind.

5. The blind defined in claim 1 in which the slats comprise two groups with the slats of one group arranged alternately with respect to the slats in the other group and with the hinge axes of the two groups respectively located in two relatively spaced vertical planes, and fixed vertically extending elements impervious to light extending into the slats between said two planes at the two ends of the blind.

6. The blind defined in claim 1 in which the two walls of each slat are integrally connected along a scored line at said axis.

7. A blind, comprising a plurality of slats of paper or the like in superposed relation vertically, each slat comprising a strip scored longitudinally thereof and dividing the slat into two parts relatively movable about the scored axis, the slats comprising two groups with the slats of one group arranged alternately with respect to the slats of the other group, means so connecting the slats that the scored axes of each group remain in a vertical plane spaced from a vertical plane in which the scored axes of the other group are located, and means attached to the top slat for supporting the blind in open position in which the slats assume an inverted V-shape and are relatively cupped in spaced relation.

8. The blind defined in claim 7 in which a portion of one part of each slat adjacent to its scoring connects that slat with the slat therebeneath.

9. The blind defined in claim 7 in which the slats are a continuous strip of paper or the like folded to produce the slats in integrally connected relation.

10. A blind, comprising a plurality of slats of paper or the like in superposed relation vertically, each slat comprising a strip scored longitudinally thereof and dividing the slat into two parts relatively movable about the scored axis, the slats comprising two groups with the slats of one group arranged alternately with respect to the slats of the other group, the slats of each group being in vertical alignment and spaced laterally of the other group, and one part of each slat from its said axis outwardly being wider than the other part and supporting the next adjacent slat therebeneath in face to face contact therewith.

11. The blind defined in claim 10 in which said next adjacent slat is in face to face contact with the slat thereabove to a position short of the said axis thereof and in which the portion of said slat thereabove between its said axis and the contacted portion is perforated to permit ventilation.

12. A blind comprising a plurality of elongated slats in superposed relation vertically, a container at the bottom of the blind for receiving the slats in collapsed position thereinto, means for raising the blind to open position from the container, the top slat being adapted to rest on and cover the container when the blind is collapsed thereinto, and side wings carried by the top slat and adapted to fit over and extend downwardly along the side walls of the container.

13. A blind, comprising a plurality of strips of paper or the like each folded transversely thereacross intermediately of two opposite ends and having portions thereof adjacent to the fold line in adhesive face to face contact, one remaining end portion of the strip being creased thereacross on a pivotal line adjacent to its said adhesive contacting portion, the other remaining end portion of the strip being creased thereacross on a pivotal line beyond its said adhesive contacting portion, the first remaining end portions beyond its crease line being wider than the second remaining end portion beyond its crease line, and the said remaining end portions of each strip being adhesively attached in face to face contact with like portions of adjacent strips whereby providing a blind comprising a plurality of said folded and creased strips.

14. A blind, comprising a plurality of strips of paper or the like each creased thereacross on a straight line providing two panels at opposite sides of the line, one panel being wider than the other panel, said strips being stacked in superposed relation with the narrower panels located alternately at opposite sides of the stack, and means securing the narrower panels in face to face contact with the free outer portions of the wider panels.

15. A blind adapted to hang vertically in a window opening, comprising a plurality of rectangular and parallel slats arranged in two laterally adjacent and parallel groups with the slats of each group extending partially into the other group within a predetermined overlapping zone, the slats of the two groups being alternately arranged in said zone and each slat being attached to the adjacent slat thereabove for hinging movement about an axis in one margin of said zone, and means for supporting the blind vertically with the slats extending horizontally and either collapsed compactly into flat superposed relation with the slats in stacked face to face contact or drawn outwardly into extended relation during which the relatively adjacent slats hinge about opposite margins of said zone to V-shape with each hinge apex portion located within the re-entrant V recess of the next adjacent V-shaped slats thereabove.

16. A blind comprising two groups of elongated slats partially overlapping uniformly along their adjacent side edge portions within a predetermined zone, the slats comprised in each group being in lateral face to face alignment and the two groups being relatively adjacent and parallel with each slat in each group extending partially into the other group between two slats thereof within said zone and attached for relative hinging movement to said two slats respectively along the lines of intersection therewith, the two hinge axes of each slat being located respectively along opposite margins of said zone with all the axes at one margin being in lateral alignment and parallel to the aligned axes at the other margin thereof, the arrangement being such that the slats can be collapsed compactly into flat superposed relation with the slats in face to face contact or drawn outwardly into extended relation during which the relatively adjacent slats hinge about said axes to V-shape with each hinge apex portion located within the re-entrant V recess of the next adjacent V-shaped slats.

WALTER L. ROY.